United States Patent [19]

Permoda

[11] Patent Number: 4,601,621
[45] Date of Patent: Jul. 22, 1986

[54] APPARATUS AND METHOD FOR ANGULARLY CONNECTING TWO PLATES

[75] Inventor: Ronald L. Permoda, Irondequoit, N.Y.

[73] Assignee: Xerox Corporation, Stamford, Conn.

[21] Appl. No.: 609,417

[22] Filed: May 11, 1984

[51] Int. Cl.⁴ .................. F16B 37/04; F16B 5/02; F16B 9/02
[52] U.S. Cl. .................. 411/182; 29/526 R; 403/258; 403/403; 403/405.1; 411/112; 411/437
[58] Field of Search ............... 411/103, 104, 107, 108, 411/111, 112, 113, 119, 21, 15, 22, 182, 437; 403/258, 260, 403, 405; 52/582, 584; 29/526 R

[56] References Cited

U.S. PATENT DOCUMENTS

| | | |
|---|---|---|
| 456,588 | 7/1891 | McGrath . |
| 1,155,613 | 10/1915 | Pleister . |
| 1,821,400 | 9/1931 | Pierce ........................ 411/21 |
| 2,974,703 | 3/1961 | Rapata ...................... 403/258 X |
| 2,993,573 | 7/1961 | Bloedow . |
| 3,053,300 | 9/1962 | Quinto . |
| 3,106,994 | 10/1963 | Scott ........................ 411/107 X |
| 3,385,617 | 5/1968 | Gehring ..................... 403/258 |
| 3,425,725 | 2/1969 | Givot et al. ................ 403/403 |
| 3,498,655 | 3/1970 | Arms et al. ............... 411/337 X |
| 3,511,525 | 5/1970 | Friedling et al. . |
| 3,527,280 | 9/1970 | MacNorius ................ 403/258 X |
| 3,606,415 | 9/1971 | Friedling et al. . |
| 3,837,136 | 9/1974 | Graham et al. ............... 52/760 |
| 3,919,826 | 11/1975 | Mez ........................... 52/758 |
| 3,967,432 | 7/1976 | Starr .......................... 52/384 |
| 4,116,510 | 9/1978 | Franco ..................... 411/437 X |
| 4,154,547 | 5/1979 | Mez ........................... 403/403 |
| 4,197,030 | 4/1980 | Debaigt .................... 411/437 X |

FOREIGN PATENT DOCUMENTS

| | | | |
|---|---|---|---|
| 597645 | 5/1960 | Canada ............................ 411/437 |
| 653947 | 12/1937 | Fed. Rep. of Germany ...... 411/437 |
| 55-27771 | 2/1980 | Japan ............................. 403/260 |
| 449331 | 4/1968 | Switzerland ..................... 403/258 |

OTHER PUBLICATIONS

"Southco F1 Sheet-Edge Fastener" (date and author unknown).

Primary Examiner—Thomas J. Holko

[57] ABSTRACT

An apparatus, method and article of manufacture for angularly connecting two plates. A first plate is notched. The second plate has an opening. A holding member is adapted to fit into the notch in the first plate. The holding member has a guiding channel for a fastener. The fastener is passed through the opening in the second plate and into the guided channel of the holding member and is guided into direct mechanical connection with both sides of the second slot of the first plate.

21 Claims, 8 Drawing Figures

APPARATUS AND METHOD FOR ANGULARLY CONNECTING TWO PLATES

This invention relates generally to the connection of two plates at an angle to one another, and more particularly to the angular connection of one edge of a first plate to a second plate using an improved fastening method and apparatus.

BACKGROUND OF INVENTION

Many articles and devices today are constructed of plate materials, such as sheet metal. In these devices, connections between the edge of one plate and a midplane position of another plate is common. An often-used method for making such a connection is to bend a portion of the edge of the first plate to form a flange. The flange can then be riveted or bolted to the second plate. Problems in making such a connection include the added expense in forming the flange, extra length of material of the first plate to form the flange, additional stress placed on the first plate when bent to form the flange, and extra space needed for the flange at the connection point.

Another common method for making such a connection is to weld the two plates. Problems in making this type of connection include the cost of labor-intensive welding operations, possibility of inaccurate positioning during welding, and stress on the second plate as a result of the weld. Such a connection cannot be disassembled easily. Also, some materials cannot be welded. A common plate material is composed of two thin outer layers of metal with an inner core of plastic. Because of this composition, this material cannot be welded.

As a result of these problems, there is a need for a connection apparatus or method that does not require the bending or welding of the plates to be connected. Such an apparatus or method desirably also has good mechanical strength to resist forces trying to pull the plates apart, and provides low costs of assembly, tooling, and materials.

PRIOR ART DESCRIPTION

Various fastener approaches have been devised for making a connection between two plates. The following disclosures are noted: U.S. Pat. No. 456,588 to R. McGrath, July 28, 1891; U.S. Pat. No. 1,155,613 to H. W. Pleister, Oct. 5, 1915; U.S. Pat. No. 2,993,573 to C. F. Bloedow, July 25, 1961; U.S. Pat. No. 3,053,300 to M. Quinto, Sept. 11, 1962; U.S. Pat. No. 3,511,525 to G. Friedling et al, May 12, 1970; U.S. Pat. No. 3,606,415 to G. Friedling et al, Sept. 20, 1971; U.S. Pat. No. 3,837,136 to Graham et al, Sept. 24, 1974; U.S. Pat. No. 3,919,826 to Mez, Nov. 18, 1975; and U.S. Pat. No. 4,154,547 to Mez, May 15, 1979. Portions of the foregoing disclosures are briefly summarized as follows:

McGrath discloses an expansion bolt. A hole is drilled into a receiving material and a sleeve of soft material is inserted. A screw bolt is screwed into the sleeve which forces the sleeve to expand into the hole.

Pleister discloses a bolt anchor similar to McGrath except that the anchor is only a half sleeve. The screw is screwed between the anchor and one side of the hole in the receiving material.

Bloedow discloses an anchor for joining structural steel. A socket is cut into the end of a structural steel beam. The anchor is inserted in the socket. A bolt is passed through a hole in the piece to be joined and is then threaded into the anchor.

Quinto discloses an undulated nut used to fasten two pieces of sheet metal so that there is no rotational slippage.

Friedling et al, '525, discloses a device for perpendicularly connecting two thin plates. A cylindrical shaft member is inserted through a hole in one plate. The edge to be connected of the other plate is formed to mate with a particularly shaped slot. The edge is then inserted into this slot. Friedling et al, '415, discloses a similar device.

Graham et al also discloses a connecting device for two plates using a flat connector device punched out of sheet metal. The connector device is inserted through an opening in one of the plates. The other plate is inserted into a slot in the shank of the connector device. The edge of the plate inserted into the slot is widened to mate with a widened portion of the slot.

Mez, '826 and '547, both disclose devices that are inserted through an opening in one piece of sheet metal. In the shank of each of these devices is a slot in which an edge of another piece of sheet metal is inserted. The portion of the edge in the slot in the shank is then disformed by various means to hold the sheet in position.

A publication entitled "Southco F1 Sheet-Edge Fastener" (date and author unknown) discloses a plastic device that is inserted and locked into a notch in one piece of sheet metal. A screw is passed through an opening in another piece of sheet metal and screwed in the threaded portion of the plastic device.

FIGS. 7 and 8 of the present specification show what is believed to be a prior art method of connection. No reference could be located which described this method. A first sheet has three parallel cuts made parallel to its edge. The section of metal between the edge and the first cut is bent out of the plane of the sheet. The section of metal between the first cut and the second cut is bent out of the plane in the opposite direction the first section was bent. The section between the second and third cuts is bent in the same direction as the section between the edge and the first cut. A screw is fed through a hole in a second plate and is screwed into the channel formed by the alternating sections of metal.

All the references cited herein, and their references, are incorporated by reference herein for appropriate teachings of additional or alternative details, features, and/or technical background.

SUMMARY OF THE INVENTION

The present invention desirably overcomes or reduces various of the above-discussed problems.

A general feature herein is to connect two plates at an angle to one another using a simple, low cost fastener apparatus and method.

A specific feature disclosed herein is to provide an improvement in fastening apparatus for angularly connecting two plates. A first plate has a notch and a second plate has an opening. The fastening apparatus comprises a holding member and a fastener. The holding member is adapted to fit into the notch in the first plate. The holding member includes a guide portion for guiding the fastener into the notch. The fastener is adapted to pass through the opening in the second plate and into direct mechanical connection with the opposing sides of the notch of the first plate. The fastener is guided by the guide portion of the holding member.

Further features which may be provided by the apparatus disclosed herein, individually or in combinations, include those wherein the fastening means is a self-threading screw; wherein the fastening means is a feathered nail; wherein the holding means and the second plate are one integral member; wherein the holding means and the second plate are an integral monolithic plastic molding; wherein the first plate comprises at least sheet metal; wherein the first plate is composed of two thin outer layers of sheet metal with an inner core of plastic; wherein the notch comprises integral first and second notch sections, the first notch section being wider than the second notch section and extending inwardly from one edge of the first plate, the second notch section extending inwardly from the innermost edge of the first notch section; wherein the holding means is slotted on opposing sides from one end to a position not reaching the other end, to leave an unslotted portion, so as to mate with the second notch section of the first plate; wherein the diameter of the first notch section is at least the width of the unslotted portion of the holding means, the first notch section extending from the edge of the first plate inwardly a distance at least that of the length of the unslotted portion of the holding means; wherein the second notch section is slightly smaller than the width of the fastening means such that when mated with the fastening means there is a direct mechanical connection between the fastening means and the opposing sides of the second notch section; wherein the guide means is a hollow guide channel of the holding means so as to guide the fastening means into direct mechanical connection with opposing sides of the second notch section; and wherein the holding means has a hollow nipple located on the one adapted to abut the second plate, the hollow nipple being of such a shape as to mate into the opening in the second plate.

A specific feature disclosed herein is to provide a method of angularly connecting a first and second plate with a holding guide and fastener. The second plate has an opening. The first plate is notched. The holding guide is then inserted into the notch. Next, the fastener is guided through the opening in the second plate and into the holding guide. The fastener is guided into direct mechanical connection with both sides of the notch by the holding guide.

Further features which may be provided by the method disclosed herein, individually or in combinations, include those wherein the step of notching the first plate further comprises notching the first plate with a first notch section that begins at one edge of the first plate running inwardly, the first notch section being adapted to receive the holding guide; and wherein the step of notching the first plate further comprises notching the first plate from the innermost edge of the first notch section inwardly with a second notch section having a width slightly smaller than that of the fastener.

A specific feature disclosed herein is to provide an article of manufacture for angularly connecting two plates. The article of manufacture is a holding member that has two opposing slots. These opposing slots extend from one end of the holding member to a position not reaching the opposite end. The opposing slots are adapted to mate into a notch in the first of the two plates. The interior of the holding member is adapted to guide a fastener, that has been passed through an opening in the second of the two plates, into direct mechanical connection with the notch in the first plate.

Further features, which may be provided in the article of manufacture disclosed herein, are wherein said holding member is an integral monolithic plastic molding; wherein the holding member includes a hollow nipple on the end the opposing slots do not reach, the hollow nipple adapted to mate with the opening in the second plate; wherein the hollow guide channel is a cylindrical central bore generally corresponding to the diameter of the fastener; and wherein the opposing slots have additional opposing channel slots therein partially opening the cylindrical central bore to the opposing slots to provide direct mechanical connection between the fastener and the notch of the first plate.

Various of the above-mentioned and further features and advantages will be apparent from the specific examples described hereinbelow of an exemplary apparatus, method, and article of manufacture. The following drawing figures are approximately to scale.

DETAILED DESCRIPTION

Figure 1:
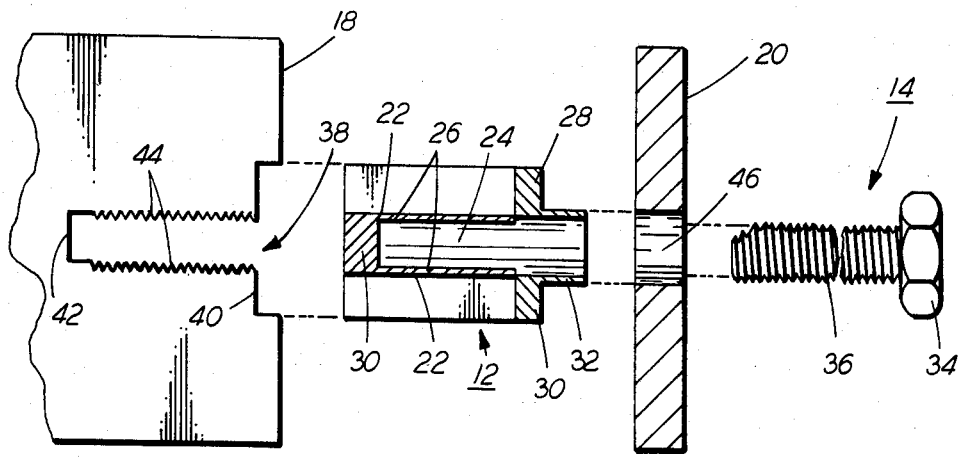
FIG. 1 is a disassembled side view of one embodiment of exemplary first and second plates, holding member and self-threading screw fastener, where the holding member and second plate are shown in cross-section.
Figure 2:
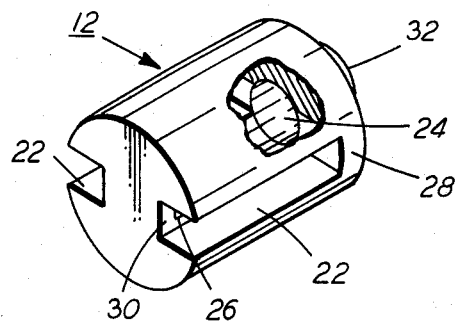
FIG. 2 is a perspective view, partially broken away, of the holding member of FIG. 1.
Figure 3:
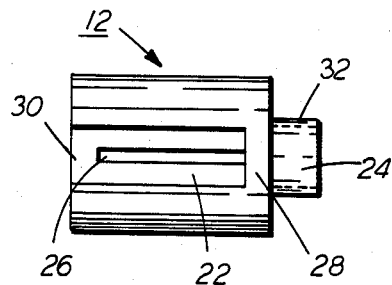
FIG. 3 is a side view of the holding member of FIGS. 1 and 2.
Figure 4:
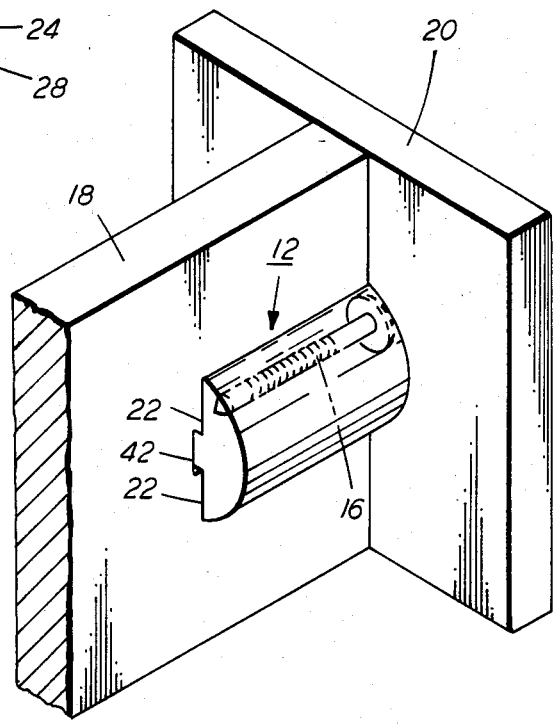
FIG. 4 is a perspective view of the exemplary holding member of FIGS. 1–3 assembled with first and second plates, but showing another embodiment of an exemplary feathered nail, in phantom.
Figure 5:
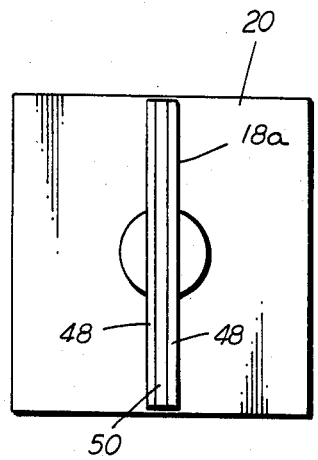
FIG. 5 is an end view of an alternate embodiment where the first plate is composed of two thin outer layers of sheet metal with an inner core of plastic.
Figure 6:
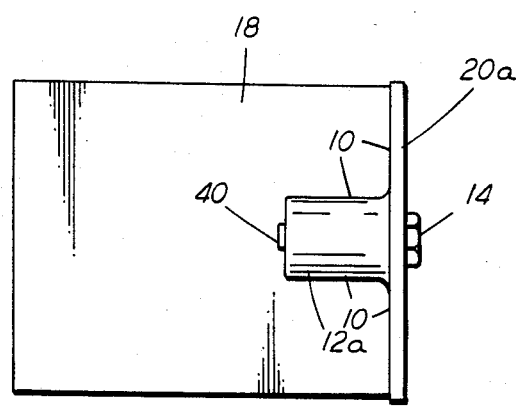
FIG. 6 is a side view of another alternative embodiment where the holding member and second plate are an integral member.
Figure 7:
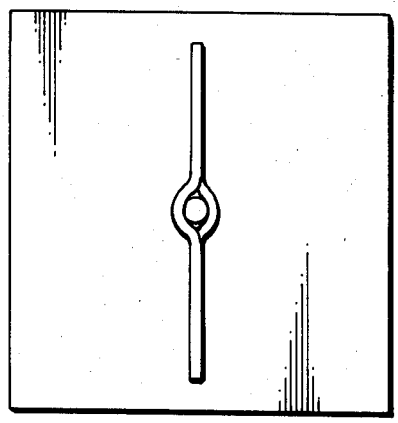
FIG. 7 is an end view illustrating a prior art plate connection and its method of connection.
Figure 8:
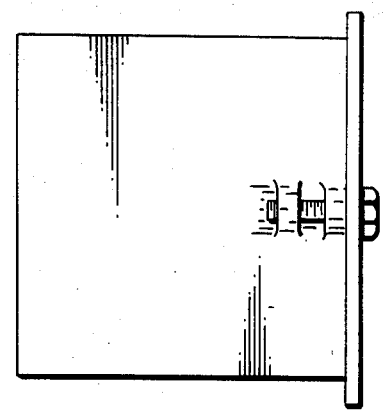
FIG. 8 is a side view of the same prior art.

FIG. 1 is a disassembled view of a complete fastening apparatus embodiment. FIGS. 2 and 3 illustrate an embodiment of a holding member 12, per se. FIG. 4 illustrates an assembled embodiment of the fastening apparatus using the holding member 12 with an alternate embodiment of a feathered nail fastener 16 shown in phantom. FIG. 5 illustrates an alternate embodiment of the fastener apparatus where the first plate 18 is composed of two thin outer layers of sheet metal with an inner core of plastic. FIG. 6 is also an alternate embodiment where the holding member and the second plate are one integral member 10.

Referring now to FIGS. 1, 2 and 3, the holding member 12 is shown from different views. Holding member 12 can be formed as a single monolithic plastic casting. The holding member 12 has a hollow guiding channel 24 adapted to guide a fastener such as the self-threading screw fastener 14 of FIG. 1. The hollow guide channel 24 extends from one end of the holding member 12 which is adapted to mate with the opening in the second plate 20. It extends through the interior, but does not reach the opposite end, leaving an unchannelled portion 30.

The diameter of the hollow guide channel 24 can be slightly smaller than, or the same as, that of the fastener.

If it is made smaller, then the threads 36 of self-threading screw fastener 14 cut into the walls of the hollow guide channel 24. This advantageous in that this assists in the concentric guiding of the fastener into mechanical connection with both opposing sides of second notch section 42, and also adds independent strength to the fastening apparatus.

The angle between the plane defined by the end of the holding member 12 adapted to be mated with the second plate 20 and opposing slots 22 determines the angle of connection of the two plates 18 and 20. While this is shown as being perpendicular, it will be obvious to one skilled in the art that this plane could be at any desired angle to form different angular connections.

Located on opposing sides of the holding member 12 are the opposing slots 22. The opposing slots 22 extend from the end of the holding member 12 that is opposite from the end that is adapted to mate with the second plate 20, to a position that does not reach the end adapted to mate with the second plate 20. This forms the unslotted portion 28 of the holding member 12. Inside these opposing slots 22 are opposing channel slots 26. The opposing channel slots 26 form an opening between the hollow guide channel 24 and innermost wall of opposing slots 22. The opposing channel slots 26 extend from the inner edge of the unslotted portion 28 of the holding member 12 to the unchannelled portion 30 of the holding member 12. The threads 36 of the self-threading screw fastener will protrude through this opening when assembled.

An additional feature, hollow nipple 32, can be located on the end of the holding member 12 and be adapted to mate with the second plate 20. The hollow nipple 32 should extend from the end of the holding member 12, adapted to mate with the second plate 20, outwardly a distance not longer than the thickness of the second plate. Hollow nipple 32 acts as an alignment device during assembly before a fastener is inserted.

With further reference to FIG. 1, there is shown an embodiment of the fastening apparatus in a disassembled view. The first plate 18 has notch 38 extending from one edge. Notch 38 comprises two connecting, aligned notch portions or sections, which can be formed as a single notch is a single stamping or cutting operation.

First notch section 40 extends from the edge of first plate 18. The depth from the edge inwardly of the first notch section 40 should be the thickness of the unslotted portion 28 of the holding member 12. The width along the edge of the second plate 20 of the first notch section 40 should be at least the diameter of the holding member 12 at the unslotted portion 28.

Second notch section 42 extends from the innermost edge of first notch section 40. The depth from the inner edge of the first notch section 40 inwardly of the second notch section 42 is at least the length of the opposing slots 22. The width of the second notch section 42 should be slightly smaller than the diameter of the fastener to be used, so that the fastener will cut into the opposing sides of the second notch section 42 to form a mechanical connection.

There is an opening 46 mid-plane in plate 20. If the holding member 12 has the additional feature of hollow nipple 32, then the diameter of the opening 46 should be the outer diameter of the hollow nipple 32. The fit between the hollow nipple 32 and the opening 46 should be snug to insure proper alignment. If there is no hollow nipple 32 on holding member 12, then the diameter of opening 46 should be at least that of the diameter of the fastener.

When assembled, holding member 12 fits into notch 38 of first plate 18. Second plate 20 is placed so that opening 46 fits over hollow nipple 32. Self-threading screw fastener 14 is screwed, using head 34, into the hollow guide channel 24. Thread portion 36 of self-threading screw fastener 14 can cut into the walls of the hollow guide channel 24. When thread portion 36 reaches the opposing channel slots 26, the thread portion 36 protrudes through the opposing channel slots 26 and cuts the opposing sides of the second notch section 42 making a mechanical connection. It is this mechanical connection that provides strength in the connection. The thread portion 36 that does not protrude through the opposing channel slots 26, can cut into the walls of the hollow guide channel 24 if the hollow guide channel 24 was made slightly narrower than the diameter of the fastener. In the disassembled view of FIG. 1, the threads cuts 44 left by the self-threading screw fastener 14 are illustrated. The self-threading screw fastener 14 is advantageous in that the fastening apparatus can be disassembled and reassembled without loss of strength.

An alternate fastener is the feathered nail fastener 16, shown in phantom in FIG. 4. A feathered nail differs from a screw in that instead of a screw thread, it has circular ridges that are flared back from the tip toward the head. These ridges allow for ease of insertion, but hold against disassembly. The feathered nail fastener 16 is hammered into the hollow guide channel 24 and the circular ridges cut into the opposing sides of the second notch section 42 of the first plate 18. The feathered nail fastener 16 is advantageous because of quick assembly particularly with resilient plastic or wood. It would also be advantageous where prevention of disassembly is required An alternate embodiment is illustrated in FIG. 5 where the first plate 18a is composed of two thin outer layers of sheet metal 48 and an inner core of plastic 50. Another embodiment is shown in FIG. 6 where the second plate 20a and the holding member 12a are one integral member 10. Integral member 10 can be a monolithic casting. For example, the holding member 12a is a formed boss.

To summarize the disclosed method of angularly connecting two plates with a holding member 12 or 12a, the second plate 20 or 20a has an opening 46, and the first plate 18 or 18a is notched. The notch 38 comprises two notch sections 40 and 42, adapted to receive the holding member. The holding member is inserted into the notch. The second plate is placed such that its opening is aligned on hollow nipple 32 of the holding member. Self-threading screw fastener 14 is screwed into the hollow guide channel 24 of the holding member 12 and into mechanical connection with the opposing sides of the second notch section 42 of the first plate 18 or 18a, or the feathered nail fastener is similarly driven in.

While the embodiments disclosed herein are preferred, it will be appreciated that they are merely examples, and that various alternatives, modifications, variations or improvements thereon may be made by those skilled in the art from this teaching, which are intended to be encompassed by the following claims:

What is claimed is:

1. Fastening apparatus for angularly connecting first and second angularly disposed plates,
   said fastening apparatus comprising:

holding means adapted to fit into a notch provided in an edge in a first plate member to be fastened to an angularly disposed second plate member, said notch being defined by generally opposing sides extending inwardly from said edge of said first plate member, said holding means including guide means for guiding a fastening means into said notch; opposing slot means adapted for slidable engagement with the opposing sides of said notch, said opposing slot means including channel slot means forming a narrow opening between said guide means and said slot means, and extending therealong; and fastening means adapted to pass through an opening in said second plate member and through said guide means, said fastening means including gripping means adapted for direct mechanical engagement with said opposing sides of said notch of said first plate member, through said channel slot means.

2. The fastening apparatus of claim 1 wherein said fastening means is a self-threading screw.

3. The fastening apparatus of claim 1 wherein said fastening means is a feathered nail.

4. The fastening apparatus of claim 1 wherein said holding means forms an integral unit with a second plate member to be fastened to a first plate member.

5. The fastening apparatus of claim 1 wherein said holding means forms an integral unit with a second plate member to be fastened to a first plate member forming an integral monolithic plastic molding.

6. The fastening apparatus of claim 1 wherein said notch comprises integral first and second notch sections, said first notch section being wider than said second notch section and extending inwardly from one edge of said first plate member, said second notch section extending inwardly from said first notch section.

7. The fastening apparatus of claim 6 wherein said fastening means is a self-threading screw.

8. The fastening apparatus of claim 6 wherein said opposing slot means extend along the sides of said holding means from a first end thereof adapted for engagement with said second notch section in said first plate member, to a position not reaching a second end adapted for abutment against said second plate whereby said opposing slot means are adapted to mate with said second notch section of said first plate; and a portion of said holding means adjacent said second end is adapted for engagement with said first notch section of said first plate.

9. The fastening apparatus of claim 8 wherein said fastening means is a self-threading screw.

10. The fastening apparatus of claim 6 wherein said second notch section is slightly smaller than the diameter of said fastening means such that when mated with said fastening means there is a direct mechanical connection between said fastening means and the opposing sides of said second notch section.

11. The fastening apparatus of claim 10 wherein said fastening means is a self-threading screw.

12. The fastening apparatus of claim 10 wherein said guide means comprises a hollow guide channel through said holding means for guiding said fastening means into direct mechanical engagement with opposing sides of said second notch section.

13. The fastening apparatus of claim 12 wherein said fastening means is a self-threading screw.

14. The fastening apparatus of claim 1 wherein said holding means is an integral monolithic plastic molding.

15. The fastening apparatus of claim 1 wherein said holding means includes a hollow nipple means extending from said holding means, annularly surrounding said guide means, and adapted to engage with an opening in a second plate member.

16. The fastening apparatus of claim 15 wherein said holding means is an integral monolithic plastic molding.

17. The fastening apparatus as defined in claim 15 wherein said guide means comprises a hollow channel forming a cylindrical central bore generally corresponding to the diameter of said fastening means.

18. The fastening apparatus of claim 17 wherein said holding means is an integral monolithic plastic molding.

19. A method of angularly fastening first and second plates with a holding means and fastener means, including the steps of:
providing a notch with opposing edges in a first plate edge;
providing a fastener receiving opening in a second plate;
providing a holding means with slot means for slidably engaging with said notch edges, guide means for receiving a fastener means and channel slot means extending through said holding means from said slot means to said guide means, whereby said notch edges are accessible to said fastener means in said guide means;
slidingly engaging said holding means with said notch edges;
inserting a fastener member through said receiving opening, and through said guide means to engage with said notch edges through said channel slot means.

20. The method of angularly connecting a first and second plate, of claim 19, wherein the step of notching said first plate further comprises notching said first plate with a first notch section that begins at one edge of said first plate running inwardly, said first notch section being adapted to receive said holding guide.

21. The method of angularly connecting a first and second plate, of claim 20, wherein the step of notching said first plate further comprises notching said first plate from the innermost edge of said first notch section inwardly with a second notch section having a width slightly smaller than that of said fastener.

* * * * *